United States Patent [19]

Ladewski

[11] Patent Number: 5,465,153
[45] Date of Patent: * Nov. 7, 1995

[54] ELECTRO-OPTICAL SYSTEM FOR GAUGING SPECULAR SURFACE PROFILE DEVIATIONS

[75] Inventor: Theodore B. Ladewski, Ann Arbor, Mich.

[73] Assignee: KMS Fusion, Inc., Ann Arbor, Mich.

[ * ] Notice: The portion of the term of this patent subsequent to Feb. 22, 2011, has been disclaimed.

[21] Appl. No.: 136,230

[22] Filed: Oct. 13, 1993

Related U.S. Application Data

[63] Continuation-in-part of Ser. No. 770,885, Oct. 4, 1991, Pat. No. 5,289,267.

[51] Int. Cl.$^6$ .............................. G01B 11/00; G01J 1/02
[52] U.S. Cl. .................... 356/376; 356/371; 356/243
[58] Field of Search ..................... 356/371, 375, 356/376, 243, 237, 239, 394, 445, 446; 250/330, 333, 561, 562, 563, 572; 358/101, 106, 107

[56] References Cited

U.S. PATENT DOCUMENTS

| | | |
|---|---|---|
| 171,838 | 1/1876 | Munnich . |
| 2,250,521 | 7/1941 | Boeder . |
| 2,438,743 | 3/1948 | Feinbloom . |
| 2,645,971 | 7/1953 | Herbst ..................................... 356/376 |
| 2,693,735 | 11/1954 | Zehender .............................. 356/371 |
| 2,695,544 | 11/1954 | Brenner ................................. 356/371 |
| 3,804,532 | 4/1974 | Patten et al. ........................... 356/244 |
| 3,891,320 | 6/1975 | Kimura et al. ......................... 356/371 |
| 4,049,350 | 9/1977 | Brück ..................................... 356/239 |
| 4,290,698 | 9/1981 | Milana .................................... 356/371 |
| 4,505,585 | 3/1985 | Yoshikawa et al. . |
| 4,878,114 | 10/1989 | Huynh et al. ........................... 358/106 |
| 4,929,846 | 5/1990 | Mansour ................................ 356/371 |
| 4,960,999 | 10/1990 | McKean et al. ....................... 250/461.1 |
| 5,001,346 | 3/1991 | Barkhoudarian ...................... 250/338.5 |
| 5,106,183 | 4/1992 | Yoder, Jr. ............................... 351/212 |
| 5,118,194 | 6/1992 | Mather et al. .......................... 356/376 |
| 5,289,267 | 2/1994 | Busch et al. ........................... 356/394 |

FOREIGN PATENT DOCUMENTS 500892  3/1939  United Kingdom .

*Primary Examiner*—Hoa Q. Pham
*Attorney, Agent, or Firm*—Dykema Gossett

[57] ABSTRACT

A method and system for gauging deviations of a surface of a specular surfaced test object from a preselected nominal surface profile utilizes electromagnetic radiation that is directed towards a direction altering means and through an attenuating medium onto the reflective surface of the test object. An image sensor such as a camera is positioned to receive an image of the radiation reflected by the test object surface back through the attenuating layer, with the Intensity of such radiation varying across the image as a function of the deviation of the test Object surface from the nominal surface profile. The sensor output is digitized to form a set of digital signals indicative of the intensity of radiation associated with each location of the reflected image, and the digitized signals are stored in digital electronic memory and/or displayed on a screen. Methods for correcting optically generated errors in the image are disclosed that, together with the gauging system, provide a quantitative measurement of the deviations in test surface profile from a preselected profile over the entire surface being measured.

30 Claims, 7 Drawing Sheets

ELECTRO-OPTICAL SYSTEM FOR GAUGING SPECULAR SURFACE PROFILE DEVIATIONS

This application is a continuation-in-part of the application having Ser. No. 07/770,885, filed Oct. 4, 1991, now U.S. Pat. No. 5,289,267.

The present invention is generally related to a system for determining the trueness of an object from a predetermined geometry. More specifically, this invention is related to a highly automated, electro-optical system for gauging deviations of a surface profile of a test object from a predetermined nominal profile geometry and a method for gauging deviations of such surface profiles. The methods and apparatus of this invention are suitable for use with test objects having flat surfaces or contoured surfaces. The methods and apparatus associated with this invention are also suitable for use with test objects with specular or shiny surfaces.

BACKGROUND OF THE INVENTION

It has been proposed to estimate the flatness of a surface on a test object by visually observing reflection through a dye liquid film or layer placed between the test surface and a flat master surface. For example, U.S. Pat. No. 2,695,544 discloses a system consisting of, in order, a pane of glass, a dye layer, and the test object. Light is directed through the pane of glass and into the dye layer. The operator then visually observes the light reflected by the test object surface back through the dye layer and the glass pane. Since the light energy is attenuated as a function of distance traveled through the dye layer, departure of the reflected light from uniform intensity across the image generally indicates a corresponding departure of the test object surface from flatness or parallelism with the surface of the glass pane. This method is limited to a subjective and qualitative estimate of the flatness of the test object. This method is also limited by the visual acuity of the operator which will, of course, vary from operator to operator. This method cannot account for differences in reflectivity of the test object across its surface or for differences in the illumination or for other artifacts. This method is suitable for use only in relatively less-demanding quality control applications where parts are either accepted or rejected depending on their qualitative deviation from a prescribed geometry. This method is generally not suitable for use in the operation, control, and/or modification of a manufacturing process wherein the parts are produced. This method is generally not useful in quality control or other operations where it is necessary to quantitatively determine the deviations of the test object from a prescribed geometry.

It is desirable, therefore, to provide a system and a method for gauging the deviations of a test object from a predetermined nominal profile geometry with enhanced and improved capabilities for precise quantitative measurement of surface deviations over the entire surface of the test object. It is also desirable to provide a system and a method for gauging the deviations of a test object from a predetermined nominal profile geometry with improved measurement resolution that is adapted for use in conjunction with test objects having a wide variety of geometries and optical characteristics. It is also desirable to provide such a system and method that includes a calibration means for correcting optically generated errors and for compensating against effects of background radiation, variations in illumination intensity, and variations in test object reflectivity. It is also desirable to provide such a system and method that allows for improved control of measurement resolution, and that is readily adapted for automation. The present invention provides an improved system and method for gauging the deviations of a specular surfaced test object from a predetermined nominal profile geometry which achieves these just described objectives and criteria.

SUMMARY OF THE INVENTION

In its most general terms, the presently preferred embodiment of the system for gauging surface geometry of a test object using electromagnetic radiation associated with this invention includes a source of electromagnetic radiation for irradiating the test object. Means for altering the direction of travel of the electromagnetic radiation originating from the source before that radiation irradiates the test object are also included. Means for sensing an image of the electromagnetic radiation that originates from this source and reflects from the test object are positioned to properly receive an image of that reflected radiation. An attenuating medium is preferably disposed between the test object and the sensing means such that the radiation reflected from the test object travels through the attenuating medium prior to being received by the sensing means. In this manner, the intensity of the received radiation varies across the image as a function of the test object surface geometry. Lastly, means for calibrating the system and producing a set of correction data for correcting optically generated errors in the image are provided.

The method associated with the present invention for gauging a surface on a test object using electromagnetic radiation includes the steps of irradiating the test object and attenuating radiation that reflects from the test object. In a preferred embodiment, the direction of travel of the electromagnetic radiation is altered before it irradiates the test object. The intensity of the attenuated radiation the reflects from the test object is then sent and an image is produced of the test object surface that is defined by the intensity of the sensed radiation across the test object surface. Any optically generated errors in the image are corrected to thereby produce a corrected image of the test object surface.

One embodiment of the inventive system for gauging deviations of a surface on a test object from a preselected nominal surface geometry includes a reference surface that is essentially transparent to the electromagnetic radiation used. The reference surface may be substantially a matched or mated surface to the preselected nominal surface geometry of the test object. The terms "matched surface" or "mated surface" as employed in the present application mean that the reference or master surface essentially contains the complement image of the prescribed nominal surface geometry which is the desired profile of the test object such that, when the master surface and the test object are brought into adjacent opposition as shown in FIG. 2, the separation between the master surface and the test object will be essentially uniform across the surfaces. For example, if the nominal surface geometry of the test object is flat, the master surface of the reference surface is likewise flat. If the nominal surface of the test object is of convex curved shape, the master surface of the reference surface is of complementary concave curved shape. An essentially non-scattering or low-scattering attenuating medium is placed between the test surface and the master surface, with the test surface opposed to the master surface. The attenuating medium may be a dye fluid or any appropriate medium (fluid, powder, or gas) providing that the medium attenuates the electromagnetic radiation with minimal scattering, and that the medium freely flows into and substantially fills the voids between the master surface and the test surface. The test object may be immersed in the attenuating fluid (such as a dye fluid). The attenuating medium preferably substantially fills the spaces to be gauged between the master surface and the test surface.

A source of electromagnetic radiation is positioned to direct such radiation through the reference surface and into the dye fluid. The radiation, preferably in the visible light spectrum, is directed into the dye fluid through the support and master surface. An image recording system is positioned to receive the radiation reflected off the test object and back through the dye fluid and thereby record an image of electromagnetic radiation transmitted from the dye fluid. The intensity of the radiation across the image will vary as a function of the deviations of the test object surface from the nominal geometry. The image received by the image recording system is digitized to form a series of digital signals indicative of intensity of radiation received at sequential picture elements or pixels of the image. An electronic memory receives, stores, and manipulates such digital signals as necessary.

The present invention uses the attenuation of electromagnetic radiation passing through a medium to determine and measure the deviations of a test object from that of the nominal and desired profile geometry. In the case of visible light passing through a dye layer, the light energy is attenuated exponentially as a function of the distance traveled through the dye layer. The measured deviations of the reflected light from uniform intensity (i.e., the variations in intensity of the reflected light across the surface) can be used to calculate the relative deviations of the test object surface from the master surface. Calibration means and methods allow the absolute deviations of the test object surface from the master surface to be determined.

Implementation of the present invention provides a two-dimensional image of the test object surface profile in a form suitable for digital manipulation, processing, and analysis within a computer system using appropriate software techniques. The digital image of the test object surface profile or digital data corresponding to the test object surface profile may be readily displayed or plotted in the form of a two-dimensional image illustrating the deviation profile or, with proper computer enhancement, displayed or plotted in the form of a three-dimensional image illustrating the deviation profile. Cross-sectional views of the deviation profile can readily be obtained through critical surface areas of the test object. The digital image may also be employed using conventional manufacturing process control techniques to automatically correct a part production process, to reduce or eliminate profile deviations in the test object or to correct for variations over time in the part production process due, for example, to wear or variations in the cutting process or tooling members. Digital processing and software techniques may be employed to correct for non-uniform illumination of the test object, distortion and/or gain variations in the imaging camera, non-uniformities in surface reflectivity of the test objects variations in dye characteristics across the image, and other artifacts.

The present invention can be utilized for measuring deviations of surface profiles from a reference profile master under a variety of conditions. For each condition, a preferred wavelength and attenuating medium can be selected that is based on the costs or other considerations (e.g., desired resolution, tolerances, safety considerations, and the like) relating to the imaging and digitally recording the reflected electromagnetic wave at different wavelengths. For example, to measure deviations on the order of thousandths of an inch, optical frequencies in the visible region and a dye fluid are the presently preferred embodiment of the invention because suitable inexpensive illumination systems and digitizing cameras exist for use in this embodiment. However, if it is desired to measure larger sized surface deviations, microwave radiation might be used as the illuminating radiation with a resistive dielectric fluid as the attenuating medium.

Gauging surface deviations on a specular test object presents special difficulties. The term "specular" as employed in the present application, means a surface of an object that is shiny or has mirror-like qualities. It is problematic to illuminate a specular test object in a manner allowing a single-positioned camera to obtain an adequate gauging image. It would be desirable, therefore, to provide a method and apparatus wherein the test object is illuminated from a wide range of directions so the inventive methods can be more easily and accurately applied to specular test objects. A presently preferred embodiment of the present invention provides such a system. The test object is effectively illuminated by a multidirectional light source placed behind the test object with a diffuse reflective canopy placed over the entire configuration. The reflective canopy disburses the light effectively creating numerous illuminating rays to allow the inventive methods to be employed to gauge the surface of the specular test object.

As an alternative to the above described reflective canopy configuration, it is possible to position a radiation source in front of the specular test object with a diffuse transmitting surface between the light source and the test object.

The present invention also employs particular calibrating and error correcting means and methods special to gauging specular surfaced test objects. Special algorithms and software techniques are needed because of the behavior of electromagnetic radiation as it reflects off of specular surfaces.

These and other objects and features of the present invention will become apparent to one skilled in the art from the following description of the preferred embodiments of the present invention with reference to the appended drawings, of which the following is a brief description.

DETAILED DESCRIPTION OF THE PREFERRED EMBODIMENTS

Figure 1:
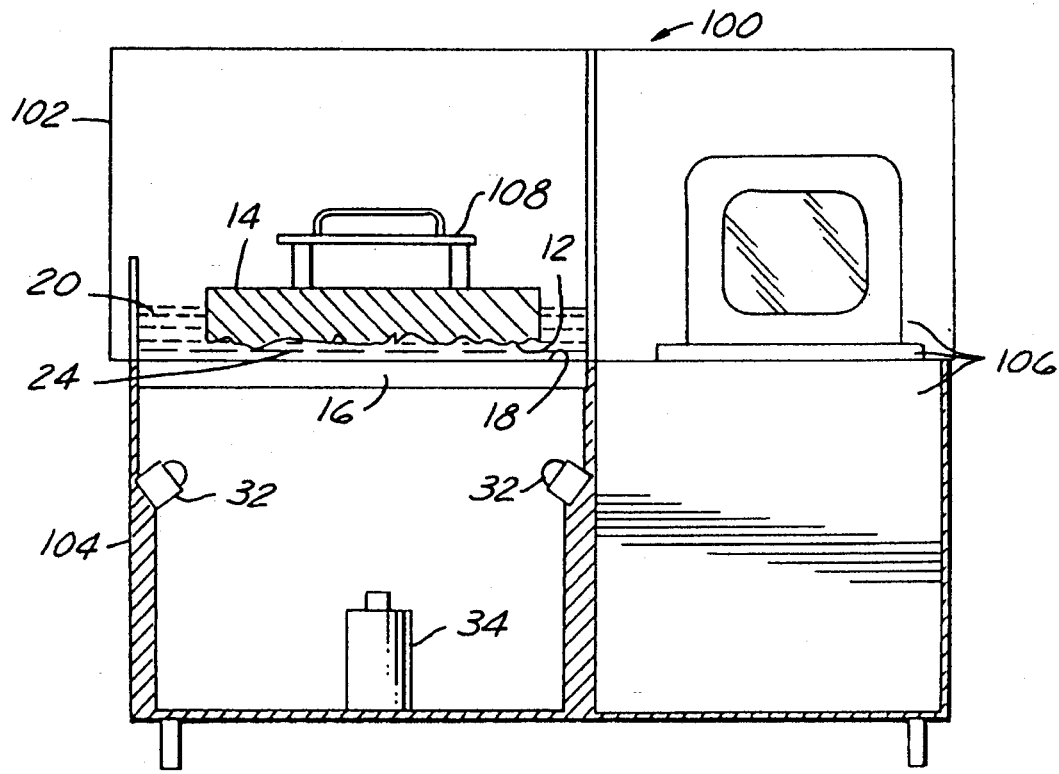
FIG. 1 is a partial sectional diagrammatic view of an inspection station using the gauging system of the present invention.

FIG. 1 generally illustrates one embodiment of this invention that includes an inspection station 100 using the gauging system of the present invention. Inspection station 100 includes a test chamber enclosure 102, an electromagnetic source and image sensor compartment 104, and the associated computer work station 106. The computer work station 106 is shown with a display screen, input device (i.e., a keyboard), and a cabinet to contain the associated computer hardware, memory, and interface devices. The test chamber enclosure 102 contains the test object 14 and test surface 12 which is to be gauged for deviations from a preselected nominal surface geometry. Using fixture 108, the test object 14 is lowered into or placed in an attenuating medium 20 using fixture 108 such that there is a thin film 24 of the attenuating medium 20 between the test object surface 12 and the master surface 18 of the master support 16. The master support 16 must be transparent to the electromagnetic radiation used. The master support 16, in this case an optical flat, provides the interface between the test chamber enclosure 102 and the electromagnetic radiation source and image sensor compartment 104. Compartment 104 contains the electromagnetic source 32 and the image sensor 34. In the embodiment of FIG. 1, two electromagnetic radiation sources 32 are used. One electromagnetic radiation source can be used; or, if desired, more than two electromagnetic radiation sources can also be used. As explained in more detail below, electromagnetic radiation from the electromagnetic radiation source 34 is directed through the master support 16 and its master surface 18, into the attenuating film 24, onto test object surface 12, and then back through the attenuating film 24 and master support 16 to the image sensor 34. The distance the electromagnetic radiation travels through the attenuating film 24 is generally equal to twice the distance between surfaces 12 and 18 at any given point on surface 12. By appropriate manipulation, the electromagnetic image received at image sensor 34 is converted into digital signals suitable for computer manipulation. Using computer and suitable software techniques via the computer work station 106, the deviations of the test object surface 12 from a preselected nominal geometry can be determined and displayed as detailed below.

As one skilled in the art will realize, the components in FIG. 1 can be reoriented in various ways. For example, the test chamber compartment 102 and the electromagnetic radiation source and image senor compartment 104 can be rotated 180 degrees relative to each other such that the test object surface 12 would be located below the electromagnetic radiation source 32 and image sensor 34. Or the compartments 102 and 104 can be arranged side-by-side with the master support 16 being essentially a vertical interface between the two compartments (i.e., the test object 14 is located on one side of the master support 16 and the electromagnetic radiation source 32 and the image sensor 34 on the other side). This side-by-side arrangement may be especially useful to eliminate or minimize air bubbles which might otherwise be trapped between the surfaces 12 and 18.

Figure 2:
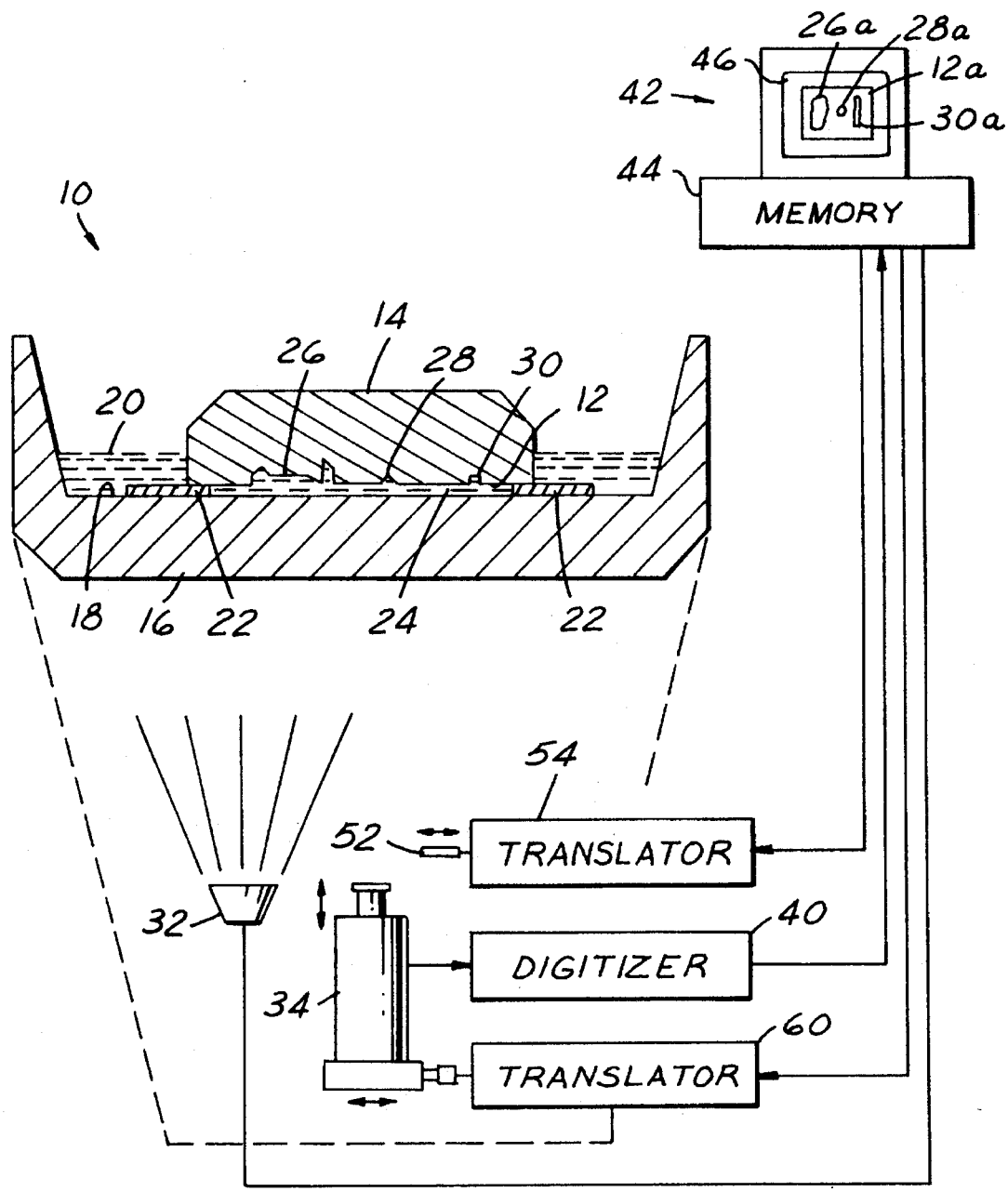
FIG. 2 is a partial sectional diagrammatic view of a gauging system in accordance with an embodiment of the present invention.

FIG. 2 illustrates a system 10 in accordance with one embodiment of the present invention for gauging or measuring deviations of the surface 12 on a test object 14 from a preselected nominal surface geometry, in this case a flat geometry. System 10 includes a support 16 having a master surface 18 that is manufactured to be a substantially exact mating or matched surface of the nominal surface geometry of the test surface 12 (i.e., a flat surface). As noted above, the terms "matched surface" or "mated surface" as employed in the present application mean that the master surface 18 essentially contains the complement image of the prescribed nominal surface geometry which is the desired profile of the test object. For example, if the prescribed nominal geometry of the test object contains, for example, a bulge in the shape of a pyramid, the master surface will contain a corresponding depression in the shape of a pyramid. Or if the prescribed nominal geometry of the test object is flat, the master surface will be flat. It is not necessary, however, that the master surface conform exactly in every detail to the prescribed nominal surface geometry of the test object. Variations between the master surface and the appropriate complement of prescribed nominal surface geometry can be corrected or accounted using for the calibration methods and apparatus described below.

An attenuating medium 20, in this embodiment a dye liquid, is carried on master surface 18 of support 16. Test object 14 rests on a plurality of shims or spacers 22 that separate master surface 18 from test surface 12 by a nominal distance corresponding to the thickness of the shims. It is generally preferred that shims 22 have the same thickness. In some cases, however, it may be preferred that shims of different thickness are used. Dye liquid 20 thus forms a fluid film or layer 24 between surfaces 12 and 18 and fills the voids and depressions 26, 28, and 30 in surface 12 of test object 14. The distance between the two surfaces 12 and 18 (i.e., the nominal thickness of the attenuating medium 20) preferably is minimized. Generally, a separation distance of about 0.01 to 0.05 inches will be satisfactory. Separations of the two surfaces 12 and 18 substantially greater than or less than these limits may, however, be employed.

The attenuating medium 20 should fill any voids, depressions, grooves, and other features to be gauged between the two surfaces 12 and 18. In some instances, they may be imperfections or designed features of the test object which are located in areas of the object that are not critical. If such areas are not to be examined, it is, of course, not necessary that such features be filled with the attenuating medium 20. In many cases, it may be preferred that such areas (i.e., the non-interest areas) be blocked or masked out to simplify analysis, and allow the operator to concentrate on the critical areas of interest. Means for masking such areas can include physical apparatus such as shields placed on the master surface or placed in front of the image sensor to limit the field of vision of the image sensor. Alternatively, means for masking can include software that selectively utilizes only portions of the radiation collected by image sensor 34 such that only selected areas on the test object surface are gauged.

In some instances, air bubbles may become entrapped between the surfaces 12 and 18, especially in pockets 26, depressions 28, or cracks 30 in surface 12 of test object 14. Although it is generally preferred that such air bubbles be minimized, it is not necessary that they be completely eliminated. Such air bubbles can be minimized by appropriate venting channels so that the bubbles can escape, careful orientation of the part as it is placed in the attenuation medium so that entrapment of such bubbles is minimized, vibration of the part or system so that the bubbles can escape, the use of degassed solvents, and the like. As noted above, air bubbles can also be minimized by orienting the compartments 102 and 104 in a side-by-side arrangement with the master support 16 in an essentially vertical orientation.

Figure 3:
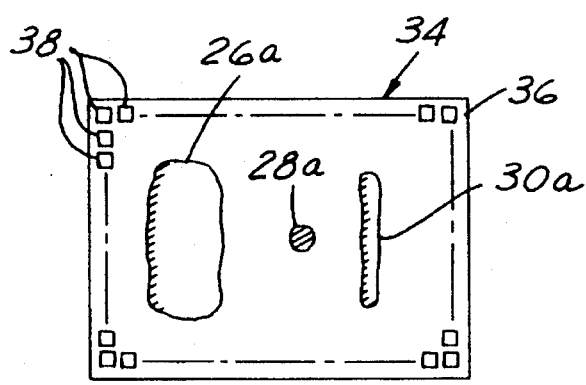
FIG. 3 is a schematic diagram of the test object surface profile image viewed by the camera in FIG. 2.

An electromagnetic radiation source 32 is positioned beneath support 16 and directs light energy through support 16 into film 24 of dye liquid 20 between surfaces 16 and 18. Support 16 is substantially transparent to such light energy from source 32. Light energy from source 32 is therefore incident on surface 12 of test object 14 through support 16 and film 24, and is reflected by the test object surface back through the dye liquid film 24 and the support 16. An image sensor 34 (e.g., a camera) is positioned adjacent to light source 32, beneath support 16 and oriented relative to support 16 so as to receive the attenuated reflections from the surface 12. Image sensor 34 is preferably responsive in a predictable manner to the electromagnetic radiation used, preferably provides the desired resolution, and is preferably capable of generating data that can be digitized. Suitable image sensors include vidicon cameras, charge coupled devices (CCDs), image array sensors, and the like. As shown in FIG. 3, image sensor 34 preferably comprises a CCD sensor 36 having a matrix of image sensing elements 38 in a row-and-column array. Each element 38 thus receives a corresponding portion or pixel of the overall image of test object surface 12. Cameras with variable focal lengths or zoom lenses are often preferred because they allow the resolution of the system to be varied relatively simply. In some instances, however, cameras with fixed focal lengths may be preferred. For example, a gauging system dedicated to a manufacturing process producing a single part might not need variable resolution capabilities. Cameras capable of interfacing with the computer and, therefore, being controlled by the computer are especially preferred.

Camera 34 is connected through suitable digitizing electronics 40 to a computer 42 that includes digital memory 44 for receiving and storing the digitized pixel signals from camera 34. Image data is thus stored as numeric data indicating the intensity of the electromagnetic radiation received for each pixel in the matrix of pixels thereby describing the radiation intensity across the image. Computer 42 also includes a user screen 46 for displaying the stored image of test object surface 12. The stored image or data can be displayed, with suitable computer manipulation or enhancement, as shades of gray or in various colors to illustrate deviations from the prescribed nominal geometry. The digital data can also be printed or plotted as desired using suitable computer-graphic techniques. The digital data (in either its raw or manipulated forms) can be stored indefinitely to allow for long-term quality control analysis. Such data might be useful, for example, to study failures of critical components where the actual failed components are not readily available (e.g., satellite malfunctions) or to perform long-term statistical analysis of failure or reject rates to pinpoint and correct manufacturing problems.

In operation, light energy from source 32 is incident on surface 12 through support 16 and dye film 24, and reflects off surface 12 back through film 24 and support 16 to camera 34. Such light energy attenuates during two passes through film 24 as a function of distance traveled through the film. Thus, if the film is of uniform thickness, meaning that surfaces 12 and 18 are parallel to each other throughout the image area, the image of test object surface 12 will be of uniform intensity (assuming uniform reflectivity across the surface 12). On the other hand, any pockets 26, depressions 28, or cracks 30 in surface 12 of test object 14 will necessarily increase the distance that the light travels through the dye film, resulting in darker sections 26a, 28a, and 30a in the image 12a of the test object surface as illustrated in FIGS. 2 and 3. In the same way, any outward protrusions in surface 12 of test object 14 (not illustrated in the drawings) will result in a correspondingly reduced distance of light travel through film 24 and correspondingly lighter areas of the test surface image. Intensity variations of the image portions 26a, 28a, and 30a are directly related to the depth of the corresponding surface irregularities, and the area of each image portion corresponds to the area of the corresponding depression in the overall surface. By accounting for system geometry and illumination variations, the transmission properties of support 16 and attenuation properties of fluid 20, the two-dimensional reflected image of test part surface 12 is converted within computer 42 to a digitized two-dimensional map 12a of the test object surface contour. Map regions of interest may be selected and magnified by the operator. By suitably calibrating the system in ways to be described, precise quantitative measurements of surface profile deviations can be obtained for analysis and/or control purposes.

Figure 4:
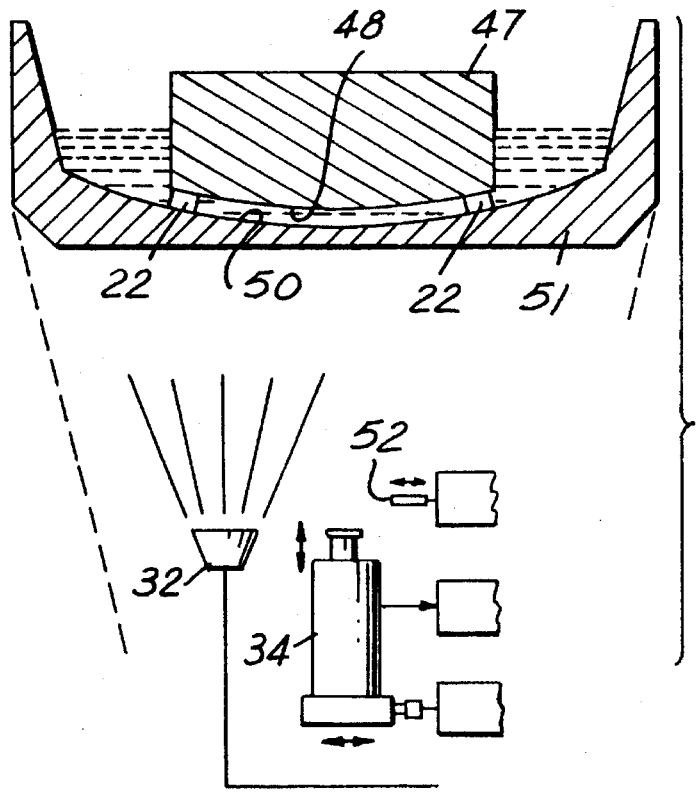
FIG. 4 is a fragmentary partial sectional diagramatic view of a modified embodiment of the present invention.

FIG. 4 illustrates a modified embodiment of the invention for gauging the profile of a test object 47 having a curved test surface 48. The master surface 50 of support 51 is either machined as a matched or mated surface of the nominal desired geometry into a glass support using, for example, a diamond lathe or is cast into a slab of suitable transparent material. In this connection, it will be appreciated that, although master surface 50 (FIG. 4) or 18 (FIG. 2) is employed as a reference surface for gauging purposes, the master surface need not be an exact replica of the nominal test object surface geometry. Small deviations in profile between the nominal surface geometry and the master reference surface can be accommodated by suitably calibrating computer 42 with a dye liquid between the master surface and the test object surface (i.e., surfaces 18 and 12 in FIG. 2 and surfaces 50 and 48 in FIG. 4) using a test object predetermined to possess a surface of desired nominal contour. Such a test object (i.e., one known to have or specifically manufactured to have the predetermined nominal surface geometry) may be retained as a "standard" for routine calibration purposes. If the amount of light reflected from all points on the standard test object surface during this calibration operation is uniform throughout, the thickness of the dye film is uniform and no corrections need to be made. On the other hand, any deviations between the master reference surface and the opposing surface of the standard part will result in a corresponding variation in intensity at one or more pixels of the reflected surface image. By measuring and storing these pixel signals at all points across the surface image, computer 42 effectively captures the correct profile of the standard part with respect to each opposing or corresponding point on the master surface. The information so obtained can then be employed to produce a set of correction data that is used to offset or bias the corresponding pixel signal or signals during system operation to accommodate any undesirable defects in the master reference surface.

It cannot always be assumed that the surface of the test object reflects the test illumination uniformly along the entire test object surface. Variations in machining, stains, or material composition can cause the reflectance of the test object surface to vary. The system in accordance with the present invention can, however, be calibrated to accommodate such variations in test object surface reflectivity. In one approach, the reflectivity of the test surface is measured first without any attenuating medium present and then with the attenuating medium in place. Similarly, a first measurement is taken employing a fluid containing a first concentration of a dye and then a second measurement is taken with a fluid containing a second concentration of dye present. These measurements can then be used to produce a set of calibration data that is used to calibrate the system according to varying reflectivity of the test object surface and eliminate the effects caused by the differences in reflectivity. Digitization of the calibration data as provided in the present invention allows such corrections to be made consistently and accurately.

In a second approach as illustrated for example in FIG. 2, the effects of surface reflectivity are removed by making measurements at two separate average wavelengths $\lambda_1$ and $\lambda_2$. An optical filter 52 is used to select the wavelength recorded by the camera. The filter is coupled to a suitable translation device 54 controlled by computer 42 for selectively translating filter 52 into and out of the path of the reflected radiation that effectively provides the test object surface image incident on camera 34. A first image of the test object surface is obtained with filter 52 removed from the image path, as illustrated in FIG. 2. This first image is taken at an averaged spectral wavelength $\lambda_1$ to which the dye has a spectrally averaged absorption coefficient $\alpha_1$. A second image is obtained with filter 52 intersecting the image path. This second image is taken at an averaged spectral wavelength $\lambda_2$ to which the dye has a spectrally averaged absorption coefficient $\alpha_2$. For the image obtained with wavelength $\lambda_1$, the measured intensity of the returned or reflected light $I_{m1}$ at a given pixel location is described by the equation:

$$I_{m1} = I_{i1} \exp(-2\alpha_1 d) R_1$$

where $I_{i1}$ is the effective incident intensity at that pixel location, d is the thickness of the dye layer at that pixel location, and $R_1$ is the reflectivity of the surface at that pixel location. Similarly, the measured intensity of the returned or reflected light $I_{m2}$ for wavelength $\lambda_2$ at that same pixel location is given by the equation:

$$I_{m2} = I_{i2} \exp(-2\alpha_2 d) R_2$$

where $I_{i2}$ is the effective incident intensity at that pixel location, d is the thickness of the dye layer at that pixel location, and $R_2$ is the reflectivity of the surface at that pixel location. Assuming that the surface reflectivity is independent of wavelength, which is a reasonably good approximation for most metals, $R_1$ equals $R_2$ in the two above equations for each pixel location. The ratio of the measured intensities at the two wavelengths is thus given by the following equation:

$$I_{m2}/I_{m1} = (I_{i2}/I_{i1}) \exp\{-2(\alpha_2 - \alpha_1) d\}$$

which no longer involves the reflectivities $R_1$ and $R_2$ of the surface. In this equation, all parameters are known except the ratio $I_{i2}/I_{i1}$ and the distance d to be determined. The ratio $I_{i2}/I_{i1}$ can be determined using a calibration feature, groove or line of known dimensions (i.e., a shim 22 could contain a groove of known depth). Alternatively, a photodiode or other light measuring device can be used to directly measure the intensity of the incident radiation at each wavelength and, therefore, determine the unknown ratio $I_{i2}/I_{i1}$ in the above equation. Solving the above equation for d yields the following equation:

$$d = \ln\{(I_{m1}I_{i2})/(I_{m2}I_{i1})\}/\{2(\alpha_2 - \alpha_1)\}$$

for each pixel location, which is independent of the reflectivity of the surface. This just described method for correcting for differences in reflectivity of the test surface is carried out by computer manipulation of the digitized signals corresponding to the image within image sensor 34. Each measured image, at the respective wavelengths, is stored in digitized form. These digital signals are processed according to the equations just described to produce a set of correction data that is used to produce an image free of errors caused by varying reflectivity across the test object surface.

As noted, this just described method for correcting for differences in reflectivity requires making measurements at two separate averaged wavelengths $\lambda_1$ and $\lambda_2$. In the above described procedure, the filter 52 was moved in and out of the image path between the surface of interest and the camera 34. Other procedures could be used to obtain the data at the two wavelengths. For example, two different filters with different spectral characteristics could be used. Or the filter 52 or different filters could be placed between the light source 32 and the surface of interest.

For larger parts, it may be desirable to correct the intensity data received at the image sensor for the increase in optical depth toward the edge of the camera's optical field. The corrected intensity $I^c(x,y)$ at a point (x,y) can be found from the following equation:

$$I^c(x,y) = I(x,y)[\cos(\theta)]$$

where I(x,y) is the uncorrected intensity at point (x,y) and $\theta$ is the angle between the camera's optical axis and the light ray from the camera to point (x,y). When the angle $\theta$ is small this correction is also small and can, therefore, be disregarded. Thus, with relatively small parts, which can fit into a narrow portion of the camera's optical field of vision, this correction can usually be omitted except where the highest degree of accuracy is needed. Even for larger parts, the camera can be moved relative to the part's surface and multiple images of the surface taken such that all surfaces of interest are contained and recorded within a narrow portion of the camera's optical field.

The apparatus and methods just described for correcting various potential errors in the image of the test object surface are collectively referred to herein as means for calibrating the system and method steps for producing correction data. These means and methods also include those to be described in detail below. The various means and methods can be used individually or in various combinations to correct whatever errors are present within the test object surface image.

The errors associated with the image formed are herein collectively referred to as optically generated errors. Optically generated errors can be caused by the nature of the test object surface or by the components of the electro-optical gauging system employed in association with this invention.

As noted above, the various corrections and calibrations can be carried out using computer software. Generally, although other general procedures could be used, these software techniques involve storing intensity data for each location (x,y) or pixel location across the image in a computer register. The corrections or other manipulations involve producing a set of correction data for example by multiplying the contents of the appropriate computer register by a suitable factor (i.e., $\cos(\theta)$ from above) or adding or subtracting the appropriate intensity amount for the calibration procedures employed to the contents of the appropriate register. Not all corrections or calibrations described herein will be appropriate or need to be made for every test object. After all desired corrections or manipulations are made, the intensity data can be plotted using suitable computer-graphics techniques. Such graphics software is available commercially. For example, suitable graphics software can be obtained from Research Systems Inc. of Boulder, Colo. or from Imaging Technology Inc. of Woburn, Mass. Other graphics software packages can also be used.

Figure 5:
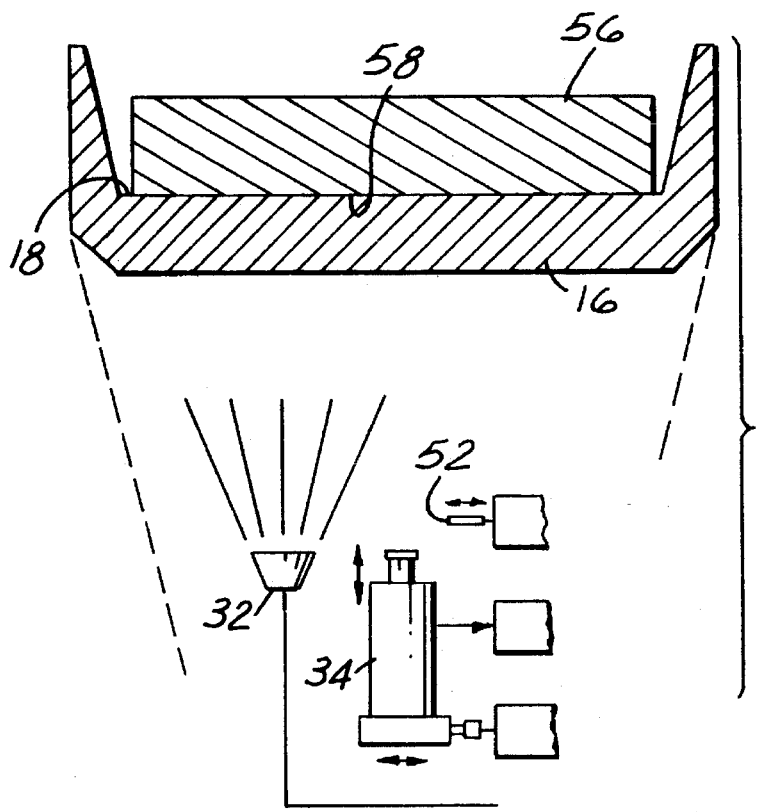
FIG. 5 is a fragmentary partial sectional diagrammatic view of a means for calibrating the embodiment of the present invention illustrated in FIG. 2.

Provision of the test part surface image in digital form suitable for storage and processing in accordance with the present invention readily accommodates calibration. For example, gain associated with each pixel of the surface image can be obtained and employed during operation in a manner analogous to that disclosed in U.S. Pat. No. 4,960,999 which is assigned to the same assignee as the present application and which is hereby incorporated by reference. Because the test part surface may not be uniformly illuminated by the light source 32, or the response of the camera elements may be spacially non-uniform, the system of the present invention preferably includes the capability of correcting for non-uniform illumination and/or detector response. Specifically and as illustrated in FIG. 5, if during a measurement the illumination geometry does not change and the strength of the illumination is held constant, spatial variations in illumination uniformity are accommodated by placing an object 56 having a surface 58 of known uniform reflectance in place of the test object on master surface 18 without the presence of attenuating fluid. The reflected image can then be measured and used to create a two-dimensional map of correction data to normalize the reflected image pixels during a test operation with the fluid in place. This two-dimensional map of correction data need only be reobtained if system geometry or detector characteristics change. For a system in which the test part surface occupies a large portion of the field of view of the camera, the light path through the dye film may not be perpendicular to the master and test surfaces across the entire image. However, such non-uniform optical path lengths can readily be accommodated through calibration techniques and generation of correction maps in a manner similar to that previously described as long as the size of the test part and the physical positioning of the light source, test part, and camera remain constant.

Figure 6:
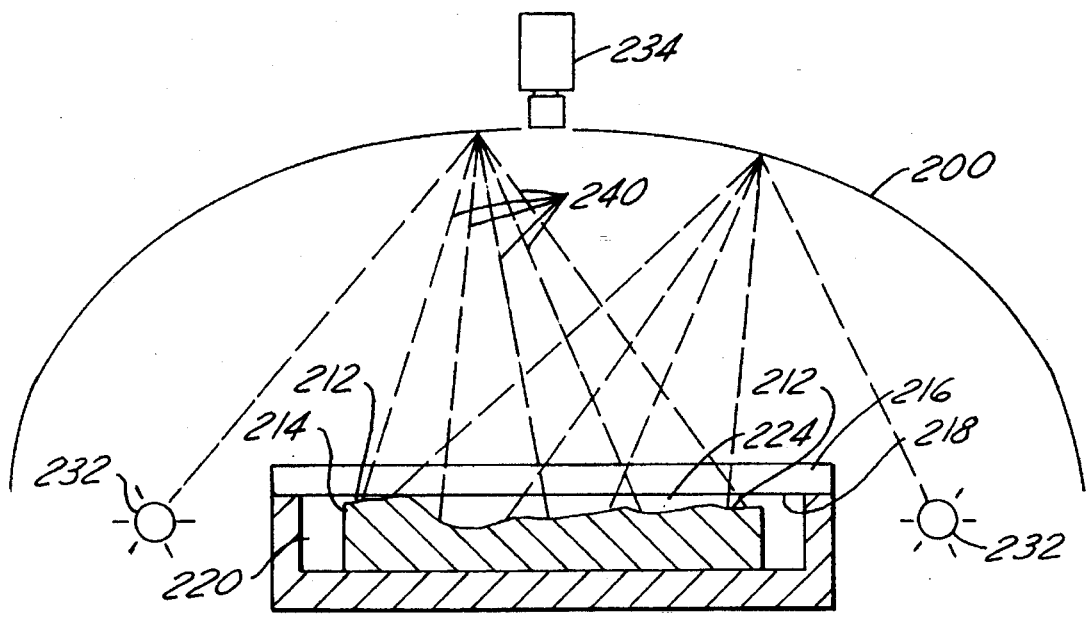
FIG. 6 is a partial sectional diagrammatic view of a preferred embodiment of the invention wherein the electromagnetic radiation source is positioned behind a specular surfaced test object and a diffuse reflective canopy is employed.

FIG. 6 illustrates a presently preferred embodiment of this invention especially adapted to gauge specular surfaced objects. A diffuse reflective canopy 200 is placed over the entire test object surface. Diffuse canopy 200 can be of any shape that will reflect electromagnetic radiation towards the test object 214. Electromagnetic radiation sources 232 are placed adjacent test object 214 and beneath canopy 200. As will be further explained below, electromagnetic radiation from electromagnetic radiation sources is directed at diffuse reflective canopy 200, effectively producing illuminating rays 240 that travel through master surface 216 and reference surface 218, into attenuating film 224, onto test object surface 212, and then back through the attenuating film 224 and master surface 216 to image sensor 234. Using conventional techniques, the electromagnetic image received at image sensor 234 is converted into digital signals suitable for computer manipulation. Using the computer and the software techniques associated with the computer workstation (not shown here but described in relation with FIG. 1), the deviations of the specular test object surface 212 from a preselected nominal geometry can be determined and displayed generally as detailed above.

In another presently preferred embodiment, the master surface 216 is eliminated. In this embodiment the distance between the test object surface 212 and image sensor 234 is determined to gauge surface 212.

Attenuating medium 220 can be a liquid or a gas. Suitable liquids may include a dye that attenuates electromagnetic radiation as described above. Suitable gases include carbon dioxide, nitrous oxide or water vapor. Ambient air could be combined in a chamber with carbon dioxide. Carbon dioxide preferably is present in a concentration ranging from a minimum amount over ambient air to 100% total chamber volume. Proper gas mixing must be ensured through conventional gas mixing techniques to prevent introducing errors caused by variations in the concentration of the attenuating gases across the image. Water vapor could be used when the test object is appropriately placed within a humidity chamber, for example.

Figure 7:
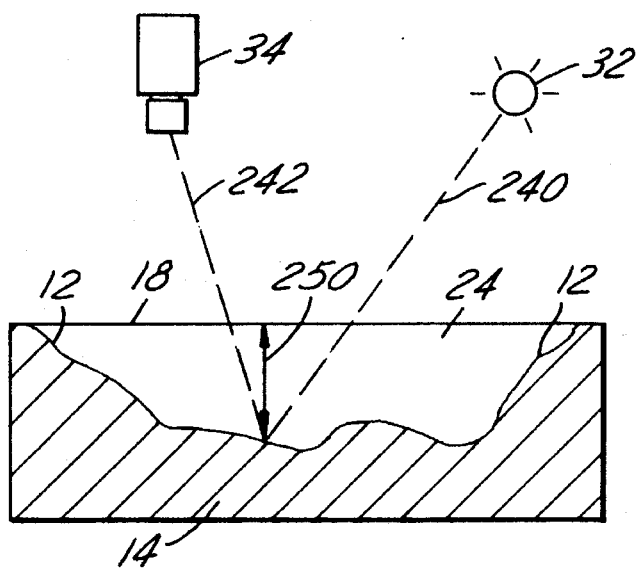
FIG. 7 is a fragmentary partial sectional diagrammatic view of an embodiment of the present invention showing the reflective behavior of the electromagnetic radiation when a diffuse surfaced test object is gauged.

FIG. 7 generally illustrates the behavior of electromagnetic radiation as it travels from electromagnetic radiation source 32, through reference surface 18 and attenuating medium 24, reflects from diffuse test object surface 12, and travels back through attenuation film 24 to image sensor 34. Illuminating ray 240 will instigate a reflective ray 242 to the image sensor 34. Reflective ray 242 will travel to image sensor 34 because of the nature of the diffuse test object surface 12. The distance between the test object surface 12 and the reference surface 18 is shown generally at 250.

Figure 8:
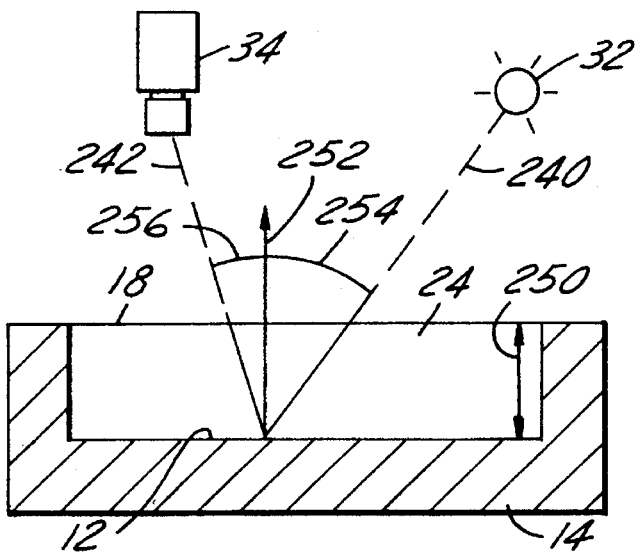
FIG. 8 is a fragmentary partial sectional diagrammatic view of an embodiment of the present invention showing a method of calculating the distance between a diffuse surfaced test object and a reference surface.

FIG. 8 generally diagrammatically illustrates a method of calculating the distance 250 between diffuse test object surface 12 and reference surface 18. The overall distance $D_1$ traveled by the electromagnetic radiation through attenuation film 24 is given by the equation:

$$D_1 = d/\cos(\theta_{c1}) + d/\cos(\theta_{s1})$$

where $\theta_{s1}$ is the angle 254 between the normal 252 to reference surface 18 and electromagnetic radiation source 32, $\theta_{c1}$ is the angle 256 between the normal 252 to reference surface 18 and image sensor 34, and d is the distance 250 between test object surface 12 and reference surface 18. Distance $D_1$ can be determined by solving:

$$I_{m1} = I_{t1} R_1 \exp(-D_1/\kappa)$$

where $I_{m1}$ is the intensity of electromagnetic radiation received by image sensor 34, $I_{i1}$ is the intensity of illuminating ray 240, $R_1$ is the reflectivity of the test object surface 12 for angles $\theta_{c1}$ and $\theta_{s1}$, and $\kappa$ is the extinction coefficient of attenuating medium 24. The above two equations can be solved for:

$$d = \{-\ln(I_{m1}/(I_{i1}R_1))/\kappa\}\{1/\cos(\theta_{c1}) + 1/\cos(\theta_{s1})\}$$

where the term $(I_{m1}/(I_{i1}R_1))$ is previously described in the present application and, therefore, distance d illustrated generally at 250 is determined for a diffuse test object surface.

There are potential problems with implementing the just described method of calculating the distance 250 between a test object surface and a corresponding reference surface. The calculation is limited by the relationship between $\theta_{s1}$ and $\theta_{c1}$. If electromagnetic radiation enters simultaneously at a second angle $\theta_{s2}$, such that $\cos(\theta_{s2})$ differs from $\cos(\theta_{s1})$, an error will be introduced. Depending on the application, this error may be unacceptably large. In the instance where two incoming rays at angles $\theta_{s1}$ and $\theta_{s2}$ are reflected back to image sensor 34, the radiation received by image sensor 34 is given by the equation:

$$I_m = I_{i1}R_1 \exp(-D_1/\kappa) + I_{i2}R_2 \exp(-D_2/\kappa)$$

where $D_1$ and $D_2$ are the total distances through the attenuating medium from first and second radiation sources, respectively. Assuming $\cos(\theta_{s1})$ equals $\cos(\theta_{s2})$, this equation can be solved for distance d between test object surface 12 and reference surface 18. This assumption will be valid if the incident electromagnetic radiation is unidirectional or limited to a narrow cone around the optical axis of image sensor 34.

Figure 9:
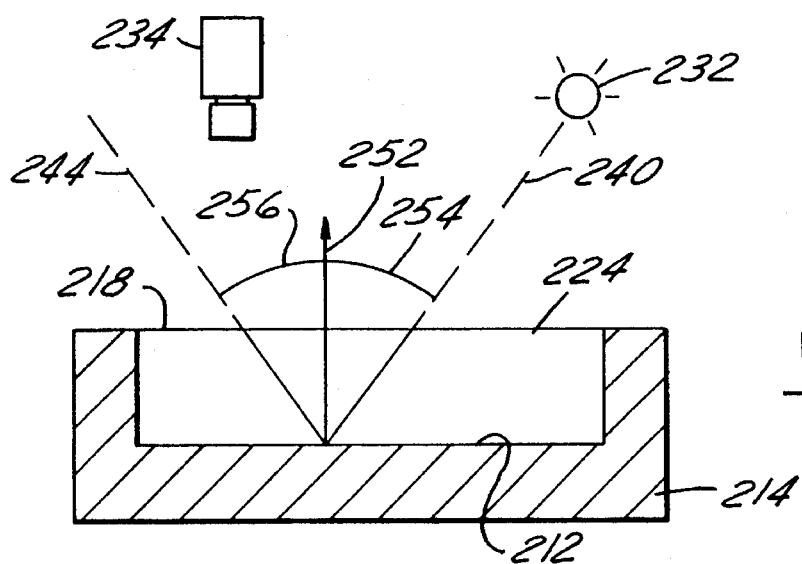
FIG. 9 is a fragmentary partial sectional diagrammatic view of an embodiment of the present invention showing the reflective behavior of the electromagnetic radiation when a specular surfaced test object is gauged.

FIG. 9 illustrates the general behavior of electromagnetic radiation as it reflects off of a specular surfaced test object 214. As illuminating ray 240 travels through the reference surface 218, attenuating film 224, reflects off of test object surface 212 and travels back through attenuating film 224, the reflective ray 244 does not travel to image sensor 234. Therefore, image sensor 234 does not receive radiation intensity information about that portion of the test object surface 212 illuminated by illuminating ray 240. This phenomenon can be explained by the law of geometrical optics that the angle of incident radiation is equal to the angle of reflectant radiation when the reflecting surface is specular.

Figure 10:
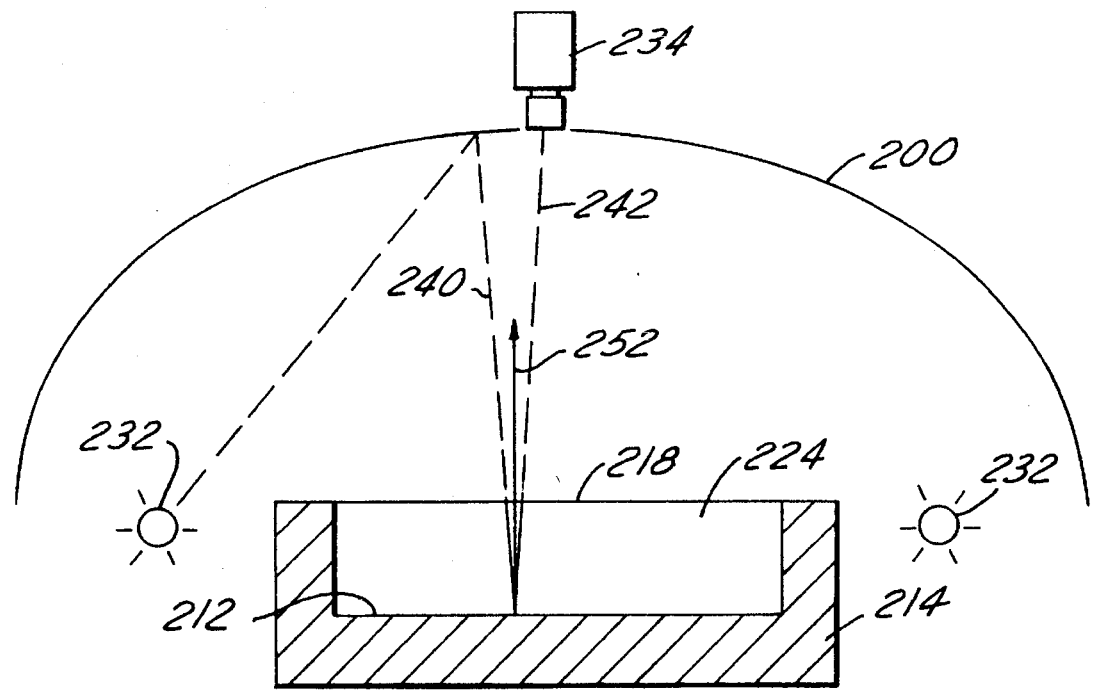
FIG. 10 is a fragmentary partial sectional diagrammatic view of a preferred embodiment of the present invention wherein a diffuse reflective canopy is employed showing the reflective behavior of the electromagnetic radiation when a specular surfaced test object is gauged.

FIG. 10 generally illustrates how the embodiment of FIG. 6 enables one to calculate the distance between a specular test object surface 212 and a reference surface 218 in accordance with the methods associated with the present invention. Multidirectional electromagnetic radiation sources 232 emit radiation towards diffuse reflective canopy 200 which effectively instigates a shower of illuminating rays 240 that travel through reference surface 218, attenuating film 224 and reflect off of specular test object surface 212. One of these illuminating rays 240 will have an angle of incidence sufficient to produce a reflective ray 242 that reaches image sensor 234. The previously described algorithm and method of calculating the distance between a test object and a reference surface will not work for a specular test object in this embodiment because the angle of incidence is not specified or known. The illuminating ray 240 is determined by the orientation of the test object 214 at the point being gauged. Further, FIG. 10 illustrates how the angle between illuminating ray 240 and the normal 252 to test object surface 212 equals the angle between normal 252 and reflective ray 242.

Figure 11:
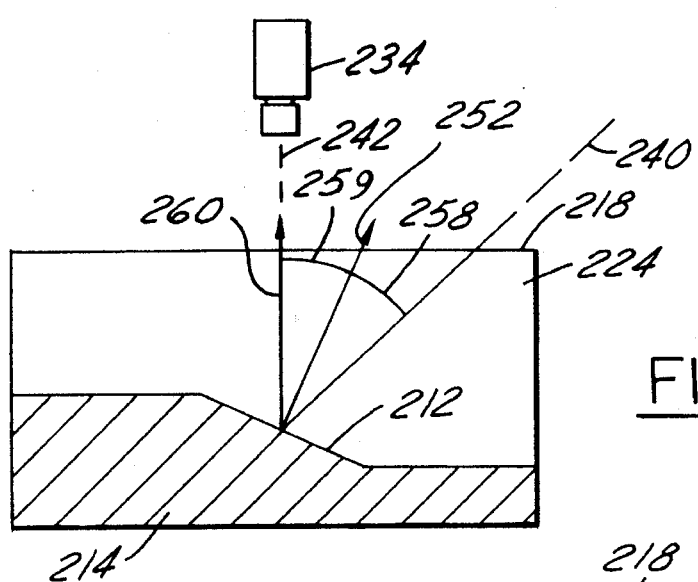
FIG. 11 is a fragmentary schematic diagram of an embodiment of the present invention showing a method of calculating the distance between a specular surfaced test object and a reference surface.

FIG. 11 more particularly diagrammatically illustrates the method of calculating the distance between specular test object surface 212 and reference surface 218. Test object 214 is disposed within a testing station, (similar to that shown in FIG. 1) and beneath the diffuse reflective canopy 200 (shown in FIG. 6), such that an attenuating medium 24 exists between test object surface 212 and reference surface 18. Illuminating ray 240 travels into attenuating medium 224 from diffuse reflective canopy 200, reflects off test object surface 212 and travels back through attenuating medium 224 into image sensor 234. For simplification, the illustrated embodiment and the following discussion include the assumptions that the optical axis of image sensor 234 is aligned with the normal 260 to the reference surface 218. The angle between the illuminating ray 240 and the normal 260 to the reference surface is equal to two times the angle of incidence, therefore, the total distance, D, traveled by the electromagnetic radiation through attenuating medium 224 is given by the equation:

$$D = d + d/\cos(2\theta)$$

where d is the distance between test object surface 212 and reference surface 218 along surface normal 260, $\theta$ is the angle of incidence which is equal to the angle of reflection because angle 258 equals angle 259 due to the law of geometrical optics that the angle of incidence is equal to the angle of reflection for a specular surfaced object. D can be determined from the earlier discussed calculations by the equation:

$$D = -\ln(I_{m1}/(I_{i1}R_1))/\kappa$$

where $I_{m1}$ is the intensity of electromagnetic radiation received by image sensor 234, $I_{i1}$ is the intensity of illuminating ray 240, $R_1$ is the reflectivity of the test object surface 212 for angle $\theta$, and $\kappa$ is the extinction coefficient.

Figure 12:
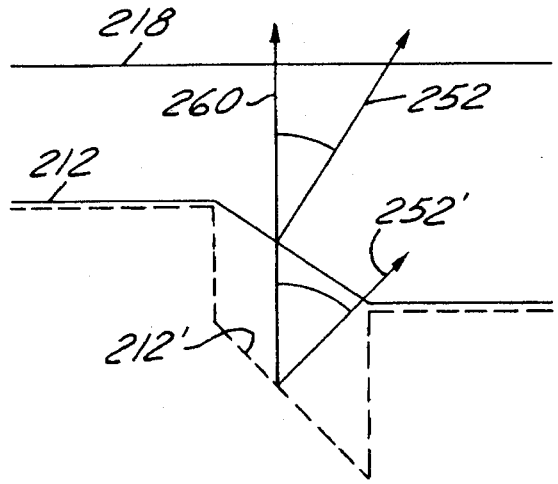
FIG. 12 is a schematic diagram illustrating some of the effects the surface angle of the test object has on the gauging of a specular surfaced test object.

Whenever the angle between a specular surfaced test object and the reference surface is greater than zero, there will be a distortion of the measured distance between the test object surface and the reference surface. FIG. 12 illustrates such a distortion of the distance between reference surface 218 and test object surface 212. The image sensor 234 receives radiation that registers as if the test object is separated from the reference surface 218 by the apparent distance between reference surface 218 and apparent test object surface 212'; i.e.: an optically generated error is introduced. Apparent test object surface 212' has an angle of orientation $\theta'$. The apparent surface angle is related to the true test object surface angle $\theta$ by the equation:

$$\tan(\theta') = (\tfrac{1}{2}(1 + 1/\cos(2\theta)))\tan(\theta)$$

where $\theta$ is the test object surface angle as defined above to be equal to the angles of incidence and reflection. Defining $\rho$ and d' as:

$$\rho = \tfrac{1}{2}(1 + 1/\cos(2\theta))$$

and $$d' = D/2$$

it follows, that the distance of apparent test object surface 212' to the reference surface 218 is defined by the equation:

$$d' = \rho d$$

where d' is the distance of apparent test object surface 212' from reference surface 218. Now the true distance d between the test object surface 212 and reference surface 218 can be calculated. Since ρ=½(1+1/cos (2θ)), applying trigonometric identities and substituting into the above equation, yields:

$$\rho=1-(\operatorname{sqrt}(1+4\tan^2(\theta'))-1)^2/(2\tan^2(\theta'))$$

which leaves ρ defined in terms of the square of the gradient of the apparent distance between test object surface 212 and reference surface 218. The true distance between test object surface 212 and reference 218 can be calculated by the following method:

(1) Perform the necessary calibration described above to determine the extinction coefficient needed in the equation:

$$D=-\ln(I_{m1}/I_{i1}R_1))/\kappa.$$

(2) Precalculate a table of values expressing the relationship between ρ and $\tan^2(\theta')$ as given in the equation:

$$\rho=1-(\operatorname{sqrt}(1+4\tan^2(\theta'))-1)^2/(2\tan^2(\theta')).$$

(3) Submit the test object to the gauging methods as explained in this application and calculate the apparent distance d' using the equations:

$$D=-\ln(I_{m1}/(I_{i1}R_1))/\kappa;\text{ and }d'=D/2.$$

(4) Calculate $\tan^2(\theta')$.

(5) Convert d' to the real distance d using the table from step (2) and the equation: d'=ρd.

In this manner, the distance between specular surfaced test object 212 and reference surface 218 is determined and test object surface 212 can be properly gauged by the methods associated with the present invention. Moreover, this method provides the ability to correct the optically generated errors in the image of the test object caused by the nature of the specular surface.

Figure 13:
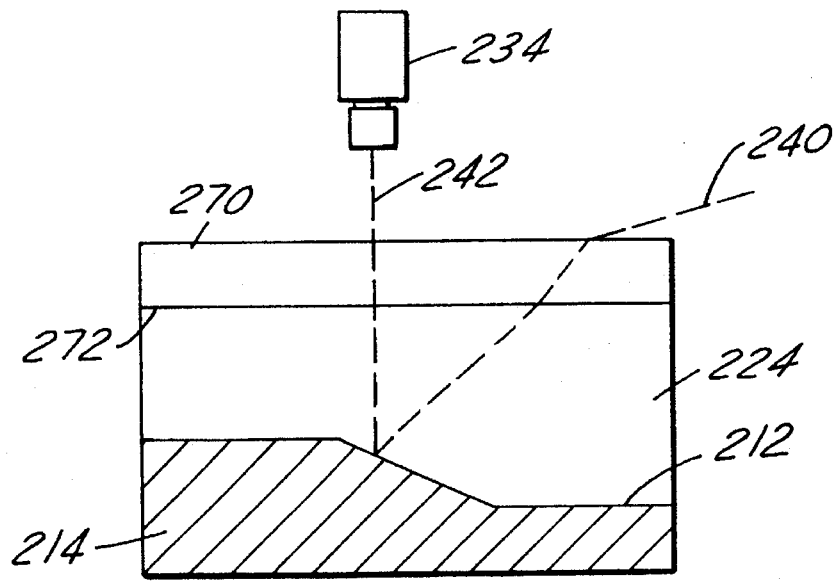
FIG. 13 is a fragmentary partial sectional diagrammatic view of the effect of refraction on the electromagnetic radiation at the interface between different transparent media.

FIG. 13 illustrates a transparent light conduit 270 as incorporated into another preferred embodiment of the present invention. Light conduit 270 can be constructed of glass, a glass-liquid combination, air or other transparent media. The embodiment illustrated in FIG. 13 incorporates a glass flat as the light conduit 270. Light conduit 270 causes refraction of electromagnetic radiation as it passes through each interface of the light conduit because of the principle of geometrical optics generally known in the art as Snell's Law. Illuminating ray 240 is shown entering light conduit 270 at an angle of approximately 82 degrees and traversing attenuating film 224 at approximately 50 degrees. The illustrated values approximate light behavior with a light conduit index of refraction approximately equal to 1.5 and an attenuating film index of refraction approximately equal to 1.3. As discussed in relation to FIG. 11, the maximum test object surface angle that can be gauged is limited to a value of half the incident angle of the illuminating ray. The illuminating ray will be refracted at the reference surface, thereby limiting the maximum gaugable surface angle. Therefore, the maximum test object surface angle that can be gauged with the configuration of FIG. 13 is approximately 25 degrees. It is desirable to have the capability to gauge test object surfaces that have a surface angle greater than that allowable by a configuration as illustrated in FIG. 13.

Figure 14:
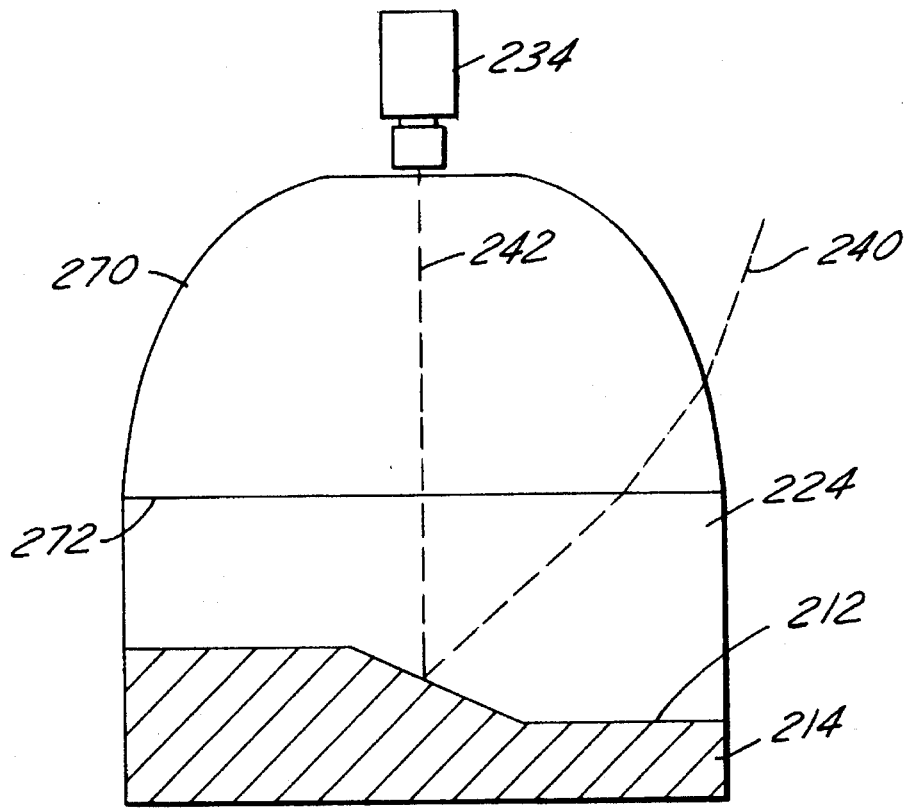
FIG. 14 is a fragmentary partial sectional diagrammatic view of the effect of refraction on the electromagnetic radiation as it travels through a dome shaped transmitting medium.

FIG. 14 illustrates another embodiment of the present invention that increases the ability to gauge test object surfaces having relatively large surface angles. Light conduit 270 now consists of a solid dome shaped piece of glass. Reference surface 272 is preferably essentially transparent to the electromagnetic radiation used. A light conduit shaped as shown in FIG. 14 can be constructed of glass, a glass liquid combination, air or other transparent media. Air would be most useful when the attenuating medium is a gas, for example. The upper surface of a light conduit as shown in FIG. 14 is diffuse except near image sensor 234; a minimum area of clear glass is required for image sensor 234 to record radiation intensity information. In such an embodiment the maximum gaugable surface angle is limited by the area of the reference surface, but not by refraction at the upper surface. Therefore, the embodiment illustrated in FIG. 14 avoids some of the limitations of the embodiment of FIG. 13; allowing the methods associated with this invention to be employed for gauging specular surfaced test objects having relatively large surface angles.

It follows that light conduit 270 and reflective canopy 200 serve generally as means for altering the direction of the illuminating rays 240. More generally light conduit 270 and canopy 200 serve as means for altering the direction of travel of electromagnetic radiation to facilitate gauging specular or shiny surfaced test objects.

Figure 15:
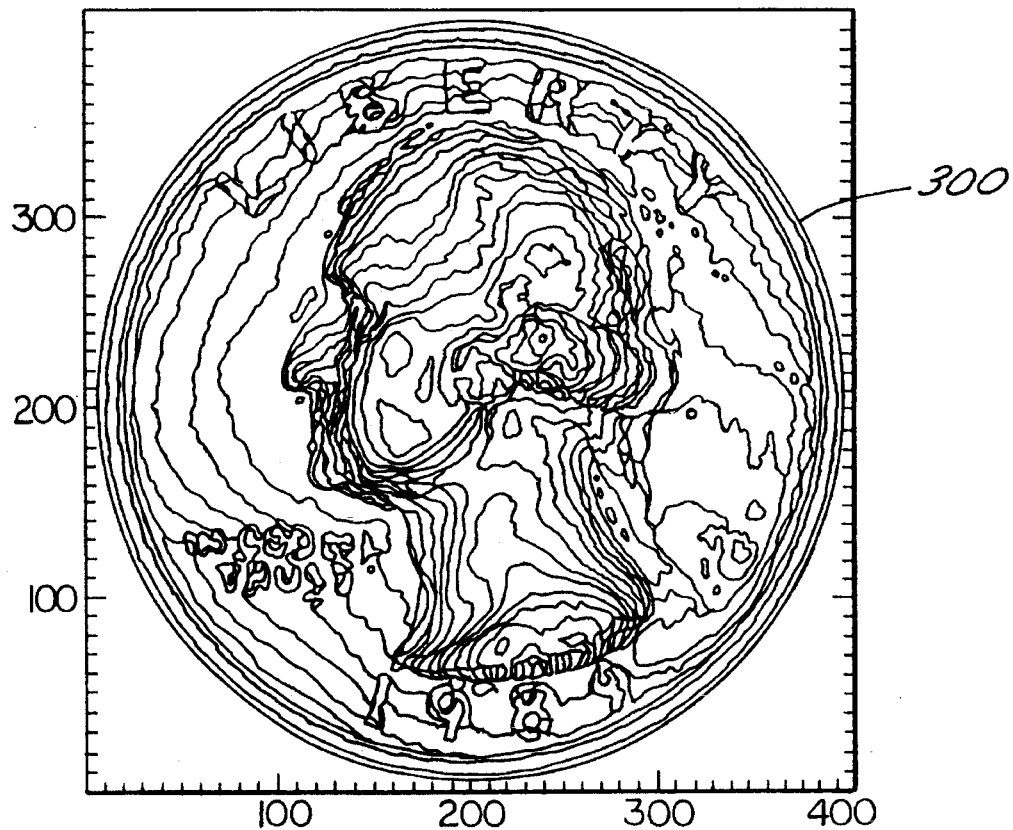
FIG. 15 is a computer-generated image of a standard United States coin generated by the gauging system of the present invention, shown in relation to a scale.

FIG. 15 illustrates the type of results that the inventive system can generate. A United States coin 300 (a quarter) was chosen as a representative specular surfaced object having fine distinctions in distance between the coin surface and a reference surface. Using visible light with a dye fluid (i.e., yellow dye) as the attenuating medium, the image of the surface of the quarter was generated using the present invention. The resulting image is essentially a two dimensional contour representation of the surface of the coin 300. FIG. 15, illustrates the accuracy obtainable with the inventive system for gauging surface profiles of specular surfaced objects. The accuracy obtained depends, in part, on the various methods and apparatus for correcting optically generated errors within the image as described above.

The use of electromagnetic energy in the visible spectrum for both illumination of and reflection from the test object surface is generally preferred. However, electromagnetic radiation from the x-ray region to the microwave region may be employed and may, in some instances, be preferred. An attenuating medium using gas or a liquid including an attenuating dye is generally preferred for use at visible wavelengths. Normally, such an attenuation medium would consists of a dye dissolved in a solvent. Suitable dyes include, for example, india ink, FD&C Blue No. 1, D&C Yellow No. 2, D&C Green No. 6, trans-β-carotene, and the like. Suitable solvents include, for example, water and organic solvents such as alcohols (e.g., methanol, ethanol, tert-butyl alcohol, amyl alcohol, and the like), transmission fluids, cutting fluids, oils, and the like, provided that the dye used is soluble therein. The attenuating medium could also comprise very fine dye powder or a gas or a liquid with a strong absorption band at the illumination wavelength. As described above, suitable gases include ambient air, carbon dioxide, nitrous oxide and water vapor.

The deviations from a nominal surface geometry for transparent parts or low reflectivity parts can also be measured by first coating the surface to be gauged with a reflective coating. The coated surface can then be gauged according to the above-described method for gauging specular surfaced objects. For example, the surface of a glass part can be coated with a thin silver coating. Such a coating can be removed after the measurements are completed (e.g., a silver coating could be removed by an acid wash). As one skilled in the art will realize, such a coating should be as thin as practical to avoid significant loss of resolution which could result from the coating "filling in" or "bridging" depressions and the like in the surface.

Figure 16:
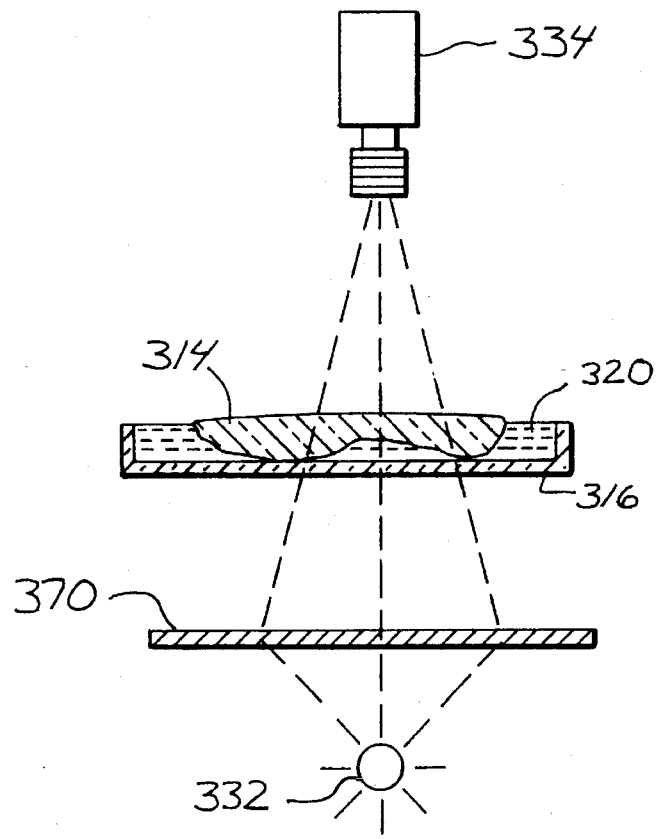
FIG. 16 is a fragmentary partial sectional diagrammatic view of an embodiment of the present invention that is adapted to gauge transparent test objects.

FIG. 16 illustrates another embodiment of the present invention that can effectively gauge the surface profile of a transparent test object. Camera 334 receives electromagnetic radiation emitted by source 332. The radiation first passes through diffuser 370, reference surface 316, attenuating medium 320 and transparent test object 314 prior to being detected by camera 334. The previously described algorithms and methods associated with the present invention used to gauge specular surfaced objects may be employed to gauge the relevant transparent test surface 312. Preferably, in this embodiment, the attenuating medium has the same index of refraction as the test object. The means for calibrating the system are the same as described above. Another method of calibrating the embodiment of FIG. 16 includes placing a glass flat appropriately in place of test object 314 with a shim of known length supporting one end. Under these conditions, the system can be calibrated by gauging the known distance between the glass flat and reference surface 316 and then using that information to produce a set of correction data to accommodate optically generated errors.

The embodiment of FIG. 16 can be modified by moving reference surface 316 to the top of diffuser 370 and properly orienting transparent object 314 such that an attenuating medium is between test object 314 and diffuser 370. Diffuser 370 is yet another example of a means for altering the direction of travel of electromagnetic radiation associated with this invention.

When the flatness of the surface of a machined part is measured relative to high tolerances, an optical flat can be used as the master and reference surface. In order to protect the optical surface—which is generally relatively expensive—from potential damage caused by placing a machined part in contact with the optical surface, a plurality of thin masks, shims, or spacers 22 may be placed between the two objects. These shims 22 would typically be placed between the optical surface and the surface to be measured at known fixed points at which surface deviations do not need to be measured. Such shims 22 are illustrated in FIG. 2. In some cases it may not be possible to locate the shims at positions where surface deviations do not need to be measured. In such cases, two different measurements can be made with the shims at different positions to obtain complete coverage of the surface of interest. Alternatively, a jig system that contains mechanical stand-offs or a mechanical fixture 108 (see FIG. 1) can be used to hold the part and prevent the object's surface from coming into contact with the surface of the optical flat.

Generally, however, shims 22 will be preferred due to their simplicity and their possible use as calibration markers. Such calibration markers can consist of grooves, slots or features of known dimensions cut or machined directly into the shims. Grooves of variable depth can be used where the depth of the groove at various locations along the groove is precisely known. In addition to providing for general calibration of the apparatus, such calibration markers can, as noted above, be used to provide the necessary calibrations used in eliminating the effect of varying reflectance of the surface.

As noted above, optical flats are relatively expensive to prepare and can be damaged if the optical flat and the test object surfaces come into contact. Shims 22, as noted above, are one way to minimize damage to the optical flat used as the master surface. As one skilled in the art will realize, however, the master surface will eventually be damaged during use and the probability of damage will increase as the number of parts tested increases. Another way in which to minimize damage to the optical flat is to simply eliminate its use as the master surface. Rather a commercial-grade glass plate (e.g., float plate glass) can be used as the master surface and the optical flat can be used as a "standard" test object to calibrate the glass plate. By placing the "standard" test object on the master surfaces, preferably with shims 22 supporting the "standard" test object, the differences between the glass plate and the optical flat can be measured and stored in the computer. By measuring actual test objects against the glass plate and using the stored optical flat calibration data, the actual test objects can be compared to the optical flat without exposing the optical flat "standard" test object to potential damage. Recalibration using the "standard" test object will be necessary from time to time to simply check the system's operating characteristics or whenever the glass plate master surface is replaced. In any event, exposure of the relatively expensive optical flat test object to potential damage will be significantly reduced.

Another method and apparatus for minimizing damage to any master reference surface is discussed in the copending application having Ser. No. 07/960,607, filed Oct. 13, 1992, and having common assignee with this application, the specification of which is hereby incorporated by reference.

Generally, as noted above, the electromagnetic radiation used is preferably in the visible spectrum. Other forms of electromagnetic radiation can be used and in some cases may be preferred. For example, microwave radiation can be used to gauge both exterior and interior surfaces of complex metal parts (such as a machined mold or a casting). To use microwave radiation, a gauge block or die is machined from a dielectric material that is highly transmissive at the microwave frequency being used. This gauge block is machined to have exterior and interior surfaces that are nearly a matched surface of the object being measured. The exact dimensions of the gauge block are chosen so that the gauge fits closely against (and inside if need be) the surfaces of the object being tested. The dielectric gauge block is then fitted next to (i.e., placed against or into as is appropriate) the metal surfaces to be measured. The dielectric gauge block is irradiated with microwaves that transmit through the dielectric and onto the metal surfaces. The strength of the signal reflected from all points (interior and exterior) on the object is first measured with a microwave detection system. Next, a partially conductive fluid (e.g., a dielectric fluid containing some carbon powder) is placed between the gauge block and the test object, the gauge block and the test object are again fitted together, and the dielectric gauge block is again irradiated with microwaves. The microwaves transmit through the dielectric, are attenuated by the resistive dielectric fluid, are reflected back from the metal surface, are attenuated again by the resistive fluid, and finally propagate back out through the dielectric gauge block. The strength of the microwave signals reflected from each point (interior and exterior) on the test object is measured and digitized. Using the intensity of signal measured at each point on the test object surface, the signal attenuation can determined. From the attenuation, the separation (thickness of the layer of attenuating fluid) at all surface points between the gauge block and the test object is determined. By comparing the measured separation with the design specifications for the test object, deviations in the shape of a manufactured object from its design specifications are directly measured.

The resolution of the system (especially for the non-depth portion) is determined in large part by camera geometry. For example, if a CCD camera with a 512×512 element array were used to image a surface 50 cm×50 cm, each pixel would correspond to about 1 mm×1 mm of the surface. The resolution of the system can be decreased or increased as needed using various techniques. For example, a CCD camera with a larger array could be used. If the image array of such a camera was increased to 1024×1024 elements, each pixel would correspond to about .5 nun×.5 nun of the same 50 cm×50 cm surface (i.e., approximately two fold increase in resolution). Resolution may also be modified by changing the effective focal length of the camera lens. By moving camera 34 closer to the test surface 12 (i.e., moving the camera in the vertical direction in FIG. 2) will increase the resolution but will decrease the percentage of the test part surface that can be observed with a given measurement. To obtain full analysis or coverage of the test part surface it may be necessary, in such a case, to take multiple measurements for a given part. Such multiple measurements could be made by moving the master surface and test part while holding the camera fixed or, preferably, by moving the camera into the desired positions (i.e., moving the camera in the horizontal direction in FIG. 2) using translator 60 (as shown in FIG. 2) to obtain complete coverage of the test part surface. By combining the measurements, analysis of the entire surface can be obtained. Translator 60 can also be used to vary the distance between the camera 34 and the test part surface 12. If desired, separate translators can be used to control movement of the camera in the vertical and horizontal directions. Preferably the translator 60 or translators are under computer control. The effective focal length and, therefore, camera resolution can also be modified by use of a zoom-type lens on the camera 34. Such a lens would eliminate the need for movement of the camera in the vertical direction. Again, it is preferred that the zoom-type lens is under computer control. For these general purposes, camera 34 is coupled to a translator 60, as shown in FIG. 2, which is controlled by computer 42.

The preceding description is exemplary rather than limiting in nature. Modifications and variations are possible that do not depart from the spirit and purview of this invention. The scope of this invention is limited only by the following claims.

I claim:

1. A system for gauging the surface geometry of a test object using electromagnetic radiation, comprising:

a source of electromagnetic radiation for irradiating a test object, said electromagnetic radiation having a direction of travel;

means for altering the direction of travel of the electromagnetic radiation originating from said source before said radiation irradiates the test object;

means for sensing an image of electromagnetic radiation that originates from said source and reflects from the test object;

an attenuating medium disposed between the test object and said sensing means such that the radiation reflected from the test object travels through said attenuating medium prior to being received by said sensing means, whereby the intensity of said received radiation varies across the image as a function of the test object surface geometry; and means for calibrating said system and for producing a set of correction data for correcting optically generated errors in said image.

2. A system as defined in claim 1, wherein said attenuating medium attenuates the electromagnetic radiation as a function of distance the electromagnetic radiation travels through the attenuating medium.

3. A system as defined in claim 2, wherein said attenuating medium is a liquid containing a dye and the electromagnetic radiation is in the visible range.

4. A system as defined in claim 2, wherein said attenuating medium comprises a gas mixture.

5. A system as defined in claim 4, wherein said gas mixture includes carbon dioxide.

6. A system as defined in claim 1, wherein said altering means includes a reflective canopy that diffusely reflects electromagnetic radiation originating from said source toward the test object.

7. A system as defined in claim 6, wherein said canopy is positioned generally in front of the test object and said source of radiation is positioned to direct the radiation generally in the direction of said canopy, said source being a multidirectional source of radiation.

8. A system as defined in claim 6, wherein said reflective canopy is generally dome-shaped and positioned such that said canopy effectively surrounds the portion of the test object being gauged, said canopy having an aperture and wherein said sensing means is positioned adjacent said aperture.

9. A system as defined in claim 1, wherein said altering means includes a light conduit positioned such that said attenuating medium is between said light conduit and the test object, said light conduit causing refraction of the radiation as the radiation enters said conduit.

10. A system as defined in claim 9, wherein said light conduit has two surfaces, a first conduit surface having a generally parabolic cross-section with ends connected to a second conduit surface that is essentially flat and extends between the ends of said first conduit surface, said first conduit surface being generally opaque with a portion of said first conduit surface being essentially transparent to the electromagnetic radiation, said second conduit surface being generally opaque to the electromagnetic radiation.

11. A system as defined in claim 10, wherein said sensing means is positioned adjacent said transparent portion of said first conduit surface.

12. A system as defined in claim 1, wherein said sensing means includes a camera for detecting electromagnetic radiation that is reflected from a test object and transmitted through said attenuating medium.

13. A system as defined in claim 12, wherein said sensing means further comprises means for digitizing said image, coupled with said camera, and means for interpreting the digitized signals and for displaying the digitized signals in a format easily interpreted by an operator whereby an operator interprets the display to determine the test object surface geometry.

14. A system as defined in claim 1, further comprising a reference surface between the test object surface and said sensing means such that said attenuating medium is disposed between said reference surface and the test object and the test object surface geometry is determined as a function of the spacing between said reference surface and the test object surface.

15. A system as defined in claim 14, wherein said attenuating medium has an extinction coefficient, a surface angle on the test object relative to said reference surface has a square of a gradient and said calibration means comprises:

means for determining the extinction coefficient of said attenuating medium;

means for digitizing said image;

means for determining a relationship between said digitized image and the square of the gradient of the surface angle on the test object relative to said reference surface; and wherein said correction data is produced using said digitized image, said extinction coefficient and said square of the gradient.

16. A system as defined in claim 1, wherein the electromagnetic radiation has a wavelength and said calibration means comprises:

a filter for varying the wavelength of the electromagnetic radiation received by said sensing means;

means for storing a plurality of images corresponding to said image at different wavelengths;

means for digitizing said stored images; and wherein said correction data is produced using the digitized signals from the different wavelengths; whereby said correction data is used to correct optically generated errors related to non-uniform reflectivity from the surface of the test object.

17. A system for detecting and gauging deviations of a test object surface from a preselected nominal surface geometry using electromagnetic radiation, comprising:

a source of electromagnetic radiation;

a diffuse reflective canopy positioned such that radiation originating from said source is reflected from said canopy to thereby diffusely irradiate the test object surface;

means for sensing an image of electromagnetic radiation that reflects from the test object surface;

an attenuating medium disposed between the test object and said sensing means such that the radiation reflected from the test object surface travels through said attenuating medium prior to being received by said sensing means;

whereby the intensity of said received radiation varies across the image as a function of the test object surface geometry; and means for calibrating said system and for producing a set of correction data for correcting optically generated errors in said image.

18. A system as defined in claim 17, further comprising a reference surface that is essentially transparent to the electromagnetic radiation and wherein said attenuating medium is disposed between the test object and said reference surface such that said attenuating medium substantially fills all space between said reference surface and the portion of the test object to be gauged.

19. A system as defined in claim 18, wherein said attenuating medium has an extinction coefficient, a surface angle on the test object relative to said reference surface has a square of a gradient and said calibrating means comprises:

means for determining the extinction coefficient of said attenuating medium;

means for digitizing said image;

means for determining a relationship between said digitized image and the square of the gradient of the surface angle on the test object relative to said reference surface; and wherein said correction data is produced using said digitized image, said extinction coefficient and said square of the gradient.

20. A system as defined in claim 17, wherein said calibration means comprises:

a filter for varying the wavelength of the electromagnetic radiation received by said sensing means;

means for storing a plurality of images corresponding to said image at different wavelengths;

means for digitizing said stored images; and wherein said correction data is produced using the digitized signals from the different wavelengths and wherein said correction data is stored in a means for storing said correction data;

whereby said correction data is used to correct optically generated errors related to non-uniform reflectivity from the surface of the test object.

21. A method of gauging a surface on a test object using electromagnetic radiation, comprising the steps of:

(A) irradiating the test object;

(B) attenuating radiation reflected from the test object;

(C) sensing an intensity of the attenuated radiation;

(D) producing an image of the test object surface that is defined by the intensity of the sensed radiation across the test object surface; and (E) correcting optically generated errors in said image to thereby produce a correct image of the test object surface.

22. The method of claim 21 wherein step (A) is performed by the substeps of altering the direction of travel of the electromagnetic radiation before it irradiates the test object.

23. The method of claim 21 wherein the intensity of the radiation sensed in step (C) varies across the image as a function of the distance the reflected radiation travels through an attenuating medium.

24. The method of claim 21 wherein an attenuating medium that has an extinction coefficient is used to perform step (B) and wherein step (E) is performed by the substeps of:

determining the extinction coefficient of the attenuating medium used in step (B);

determining a relationship between a sensed image of the test object and a square of a gradient of a surface angle on the test object;

determining an apparent test object surface geometry image using the sensed image and the extinction coefficient; and producing the corrected image of the test object surface geometry using the apparent image and the relationship between the sensed image and the square of the gradient.

25. The method of claim 21, wherein the electromagnetic radiation has a wavelength and wherein step (E) is performed by the substeps of:

filtering the electromagnetic radiation to thereby vary the wavelength of the electromagnetic radiation sensed in step (C);

performing step (D) at a minimum of two wavelengths;

storing images at the different wavelengths;

digitizing each stored image;

producing a set of correction data using each digitized stored image; and storing the correction data;

whereby the correction data is used to correct for non-uniform reflectivity from the surface of the test object.

26. The method of 21, wherein the electromagnetic radiation has a direction of travel and wherein step (E) is performed by the substeps of:

irridiating the test object;

altering the direction of travel of the radiation before it irridiates the test object;

sensing an image of the radiation that reflects from the test object without attenuating the reflected radiation;

determining the intensity of the reflected radiation at each of a plurality of image locations across the image; and storing the intensity of each said location across the image;

whereby the corrected image is produced, using the stored intensity from each location and the sensed image in step (D) to correct for non-uniform reflectivity from the surface of the test object.

27. A method of gauging a specular surface on a test object using electromagnetic radiation, comprising the steps of:

(A) irradiating the test object with diffusely reflected radiation;

(B) attenuating radiation that reflects from the test object;

(C) sensing an intensity of the attenuated radiation;

(D) producing an image of the test object surface that is defined by the intensity of the sensed radiation across the test object surface; and (E) correcting optically generated errors in said image to thereby produce a corrected image of the test object surface.

28. The method of claim 27 wherein an attenuating medium that has an extinction coefficient is used in step (B) and wherein step (E) is performed by the substeps of:

determining the extinction coefficient of the attenuating medium used in step (B);

determining a relationship between a sensed image of the test object and a square of a gradient of a surface angle on the test object;

determining an apparent test object surface geometry using the sensed image and the extinction coefficient; and producing the corrected image of the test object surface geometry using the apparent image and the relationship between the sensed image and the square of the gradient.

29. The method of claim 27, wherein step (E) is performed by the substeps of:

filtering the electromagnetic radiation to thereby vary the wavelength of the electromagnetic radiation sensed in step (c);

performing step (D) at a minimum of two wavelengths;

storing images at the different wavelengths;

digitizing each stored image; and producing a set of correction data using each digitized stored image;

whereby the correction data is used to correct for non-uniform reflectivity from the surface of the test object.

30. The method of claim 27, wherein step (E) is performed by the substeps of:

irradiating the test object;

altering the direction of travel of the radiation before it irradiates the test object;

sensing an image of the radiation that reflects from the test object without attenuating the reflected radiation;

determining the intensity of the reflected radiation at each of a plurality of image locations across the image; and storing the intensity of each said location across the image;

whereby the corrected image is produced, using the stored intensity from each location and the sensed image in step (D) to correct for non-uniform reflectivity from the surface of the test object.

* * * * *